US008286337B2

(12) United States Patent
Mills

(10) Patent No.: US 8,286,337 B2
(45) Date of Patent: Oct. 16, 2012

(54) MATTRESS MATERIAL REMOVAL DEVICE

(76) Inventor: Luke Mills, Sun Valley, CA (US)

( * ) Notice: Subject to any disclaimer, the term of this patent is extended or adjusted under 35 U.S.C. 154(b) by 410 days.

(21) Appl. No.: 12/671,919

(22) PCT Filed: Jul. 23, 2008

(86) PCT No.: PCT/AU2008/001061
§ 371 (c)(1),
(2), (4) Date: Feb. 3, 2010

(87) PCT Pub. No.: WO2009/018600
PCT Pub. Date: Feb. 12, 2009

(65) Prior Publication Data

US 2011/0030205 A1 Feb. 10, 2011

(30) Foreign Application Priority Data

Aug. 7, 2007 (AU) ................................ 2007904227

(51) Int. Cl.
*B23P 19/00* (2006.01)
*B68G 15/00* (2006.01)
*B23Q 15/00* (2006.01)

(52) U.S. Cl. .................. 29/822; 29/91; 29/823; 29/824; 29/403.3; 29/403.1; 29/709; 29/700

(58) Field of Classification Search .................... 29/700, 29/701, 709, 822, 823, 824, 91, 91.1, 402.03, 29/402.06, 402.11, 403.1, 403.3, 426.1, 426.4, 29/426.5
See application file for complete search history.

(56) References Cited

U.S. PATENT DOCUMENTS

| | | | | |
|---|---|---|---|---|
| 5,048,167 | A * | 9/1991 | Heffley et al. | 29/91.1 |
| 6,101,718 | A * | 8/2000 | Zysman | 29/896.92 |
| 2009/0077784 | A1* | 3/2009 | Zysman | 29/426.1 |
| 2011/0197436 | A1* | 8/2011 | Rudolf et al. | 29/700 |

FOREIGN PATENT DOCUMENTS

| | | | |
|---|---|---|---|
| AU | 2010100054 | A4 * | 3/2010 |
| DE | 102005030765 | | 11/2006 |
| FR | 2769814 | | 4/1999 |
| JP | 08010636 | A * | 1/1996 |
| JP | 2001098451 | | 4/2001 |
| WO | WO 2009018600 | A1 * | 2/2009 |

* cited by examiner

*Primary Examiner* — Essama Omgba

(57) ABSTRACT

A mattress material removal device for bedding mattresses comprising a fixed base member 15 in FIG. 4 with at least one side panel 4 and 5 in FIG. 1, at least one overhead portion 14 in FIG. 3 and at least one guide rail 2 in FIG. 1 adapted to secure and guide the mattress over the base member 15 as it moves through the removal device; at least one brush member 12 in FIG. 5 that makes contact with the top, bottom and side of the mattress; at least one suction member 6 in FIG. 5 positioned in close proximity to at least one brush member 12; at least one sprinkler device that is positioned in close proximity to the brush member 12; a conveyor mechanism 7 and 10 in FIG. 2 which is adapted to move the mattress so that it is in contact with the components of the removal device; a control device 16 in FIG. 5 that has at least one switch which is adapted to activate and de-activate one or more features of the mattress material removal device.

23 Claims, 3 Drawing Sheets

MATTRESS MATERIAL REMOVAL DEVICE

FIELD OF THE INVENTION

This invention relates to mattresses for beds, and in particular, to a mattress material removal device that provides a means for easily removing the material of the mattress so that only the internal spring unit or other internal support remains.

Whilst the invention may be applied to any type of mattress or cushioning or other suitable application, for convenience sake it shall be described herein in terms of a removal device for removing the material of bedding mattresses.

BACKGROUND TO THE INVENTION

Most bedding mattresses comprise a spring unit which is overlayed and/or contained within a foam material and coir that is then covered with a fabric material. The foam material and design of the internal spring unit or other internal support may vary between mattresses to achieve different support levels including firm, medium or soft support. Over time the mattress will wear and become damaged and soiled due to stains, odours, lint being removed from the mattress, dust mites, other pests and pet animals. As a result, it will be necessary to re-upholster or replace the mattress material.

Removal of the mattress material to date has been achieved by physical hand cutting, ripping and pulling away the material from the underlying spring unit, which can be quite laborious, tedious and time-consuming for the people employed to handle this task.

Accordingly, it is an object of the present invention to overcome or substantially ameliorate the disadvantages of the prior art by providing a mattress material removal device, which provides a means for easily removing the material of the mattress so that only the spring unit or other internal support remains.

SUMMARY OF THE INVENTION

The present invention provides a mattress material removal device including;

- A base member;
- At least one guide rail;
- At least one brush member;
- At least one suction member;
- At least one sprinkler device; and
- A control device whereby the mattress material removal device provides a means for easily removing the material of the mattress so that only the spring unit or other internal support remains.

It is preferred that the base member may preferably be wide enough to support varying mattress sizes and weights.

It is preferred that the guide rail(s) be adapted to be fitted in a fixed or flexible position to enable a user to move the guide rail(s) to press on the top or side of the mattress as required to guide the mattress through the mattress material removal device.

It is preferred that the control device may preferably have provided a control unit that has at least one switch or button which is adapted to activate and de-activate one or more features of the mattress material removal device.

It is preferred that the brush member(s) preferably has/have provided a side panel and/or overhead portion which is adapted to connect the brush member(s) to the control device which may be adapted to be fixed to hold the brush member(s) in a fixed or flexible position to enable a user to move the brush member(s) over and around the mattress as required.

It is further preferred that the brush member(s) preferably has/have provided a brush head which is made of a wire material and includes a plurality of rough wire bristles.

It is preferred that the suction device may preferably have provided a side panel and/or overhead portion which is adapted to connect the suction member to the control device and/or vacuum source, and a suction portion which is adapted to be fitted to the side panel and/or overhead portion.

It is preferred that the sprinkler device may preferably be attached to the control device via a side panel and/or overhead portion, which is adapted to connect the sprinkler device to the control device and/or water supply and have provided a sprinkler head which is attached to the side panel and/or overhead portion.

In order that the invention may be more readily understood we will describe by way of non-limiting example specific embodiments thereof.

BRIEF DESCRIPTION OF THE DRAWINGS

The invention may be more readily understood and put into practical effect with reference to the accompanying drawing of embodiments of the invention which:—

DESCRIPTION OF THE PREFERRED EMBODIMENT OF THE INVENTION

The invention provides a mattress material removal device, which provides a means for easily removing the material of the mattress so that only the spring unit remains or other internal support. In a preferred embodiment, the removal device will be adapted to remove the material from a bedding mattress. However, it is envisaged that the features of the removal device and dimensions and shape of the removal device and/or its features may be varied to suit different mattress types and/or other suitable applications.

The mattress material removal device is preferably adapted to be automated. The removal device preferably has provided a control device 16 in FIG. 5 having at least one switch or button which is adapted to activate and de-activate one or more features of the mattress material removal device. The control device 16 and components of the invention are preferably powered from a mains supply to which the control device 16 is connected. In an alternate embodiment, the removal device may have provided its own battery source or power generator.

Figure 5:
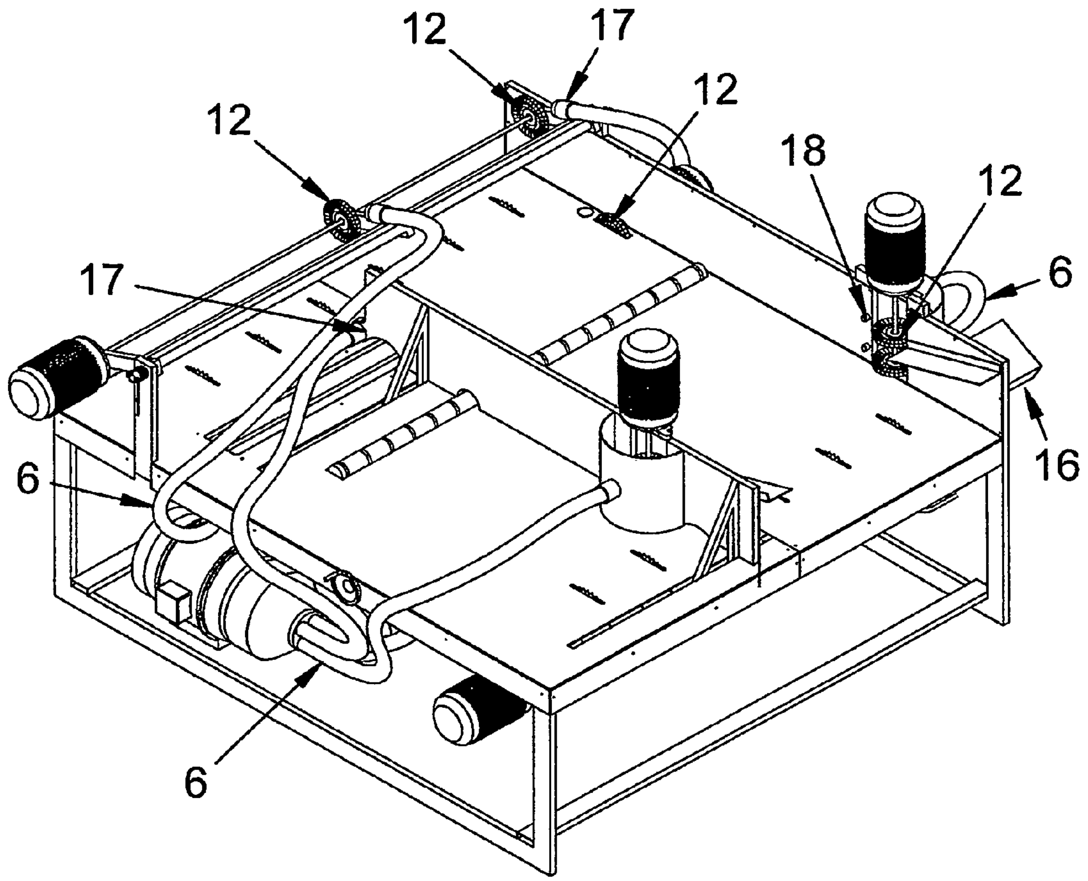
FIG. 5 is a perspective view of FIG. 1.

The mattress material removal device preferably has provided at least one brush member 12 in FIG. 5. The brush member 12 preferably has/have provided at least one side panel 4 and 5 in FIG. 1 and/or at least one overhead portion 14 in FIG. 3 which is adapted to connect the brush member 12 to the control device 16. The side panels 4 and 5 and/or overhead portion 14 are preferably made of a metal material or any other suitable material, which is strong, durable and meets the requirements of the invention. It is envisaged that the side panels 4 and 5 and/or overhead portion 14 may be adapted to be fixed or movable to hold the brush member 12 in a fixed or flexible position to enable a user to move the brush member over and around the mattress as required. In a preferred embodiment, the mattress material removal device preferably has multiple brush members 12, which are adapted to be fixed in position to contact the top, bottom and/or sides of a mattress passing through the removal device. The brush member 12 preferably has/have provided a brush head which is adapted to contact the mattress and remove the material. The brush head is preferably made of a wire material and includes a plurality of rough wire bristles. However, it is envisaged that any other suitable material may be used which is rough enough to tear and cause agitation against the mattress material to aid in its removal. The brush head is preferably adapted to be removably attached to the side panels 4 and 5 in FIG. 1 and/or overhead portion 14 in FIG. 3 and/or the base plate 1 in FIG. 1 so that it can be replaced when needed. The brush head is preferably attached to the side panel 4 and 5 and/or overhead portion 14 and/or the base plate 1 in a manner, which enables the brush head to rotate and spin freely. It is envisaged that the spinning speed of the brush head may be variable to achieve a faster or slower action and/or suit different material types. A motor 11 in FIG. 2 may preferably be provided for controlling the spinning and/or operation of the brush head and/or other components.

The mattress material removal device preferably has provided a suction member 6 in FIG. 5. The suction device may preferably have provided a side panel 4 and 5 in FIG. 1 and/or overhead portion 14 in FIG. 3 which is adapted to connect the suction member 6 to the control device 16 in FIG. 5 and/or vacuum source 13 in FIG. 3. In a preferred embodiment, the suction member 6 preferably has provided a suction portion 17 in FIG. 5, which is fitted to a side panel 4 and 5 and/or overhead portion 14. The suction portion 17 may preferably be in the form of a tube made of a plastic, rubber or any other suitable material. The tip of the suction portion 17 may preferably be shaped in an angular configuration to aid suction. However, it is envisaged that any suitably shaped tip may be adopted. The suction device is to be positioned in close proximity to the brush member 12 in order to collect the removed fibres and debris from the mattress. Connected to the suction member 6 and/or control device 16 may preferably be a vacuum source 13, which is designed to produce a sufficient degree of suction.

The mattress material removal device may preferably have provided at least one sprinkler device, which is adapted to keep the mattress wet and moist to prevent the mattress from overheating as a result of the harsh abrasion of the wire brush head(s), which could present a fire hazard. The sprinkler device may preferably be attached to the control device 16 in FIG. 5 and/or water supply via a side panel 4 and 5 in FIG. 1 and/or overhead portion 14 in FIG. 3. In a preferred embodiment, the sprinkler device has a sprinkler head 18 in FIG. 5, which is attached to the side panel 4 and 5 and/or overhead portion 14. The sprinkler head 18 may be any currently available or specially designed sprinkler head as desired. Connected to the sprinkler head 18 is preferably a pipe or tube 9 in FIG. 2 or the like which is adapted to supply water to the sprinkler head 18. The sprinkler device is preferably adapted to be connected to a water supply via a tap or plumbing connection to a mains water supply or alternatively via connection to a portable water source.

Figure 1:
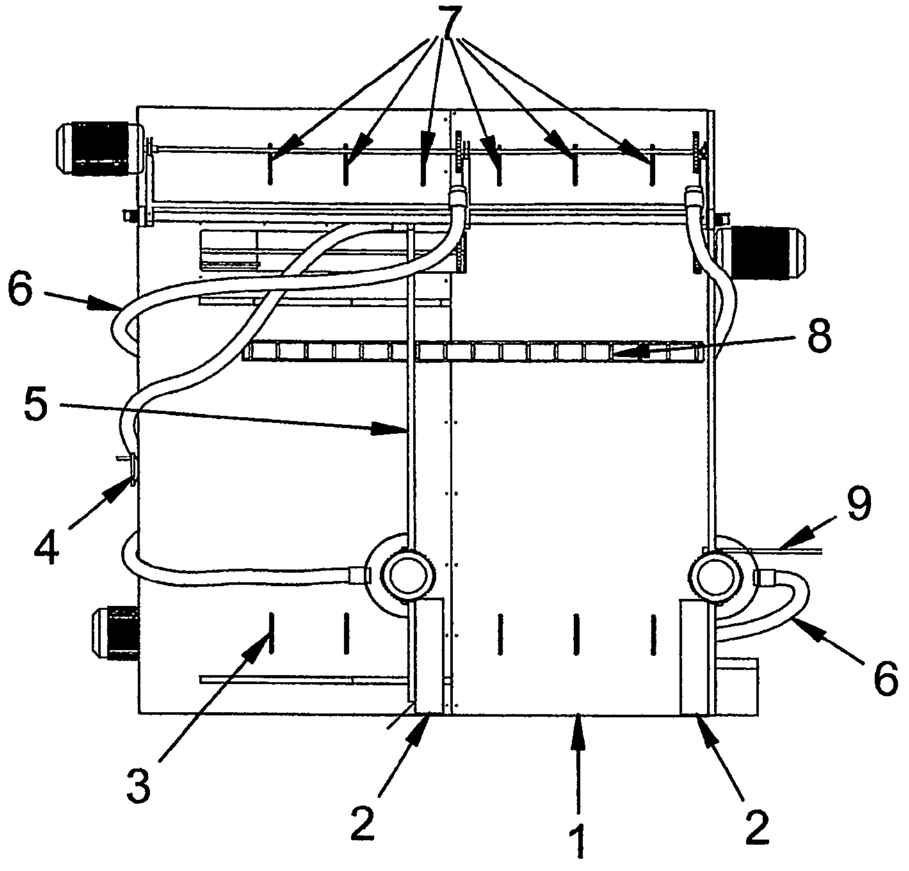
FIG. 1 is a plan elevation view of the mattress material removal device.
Figure 4:
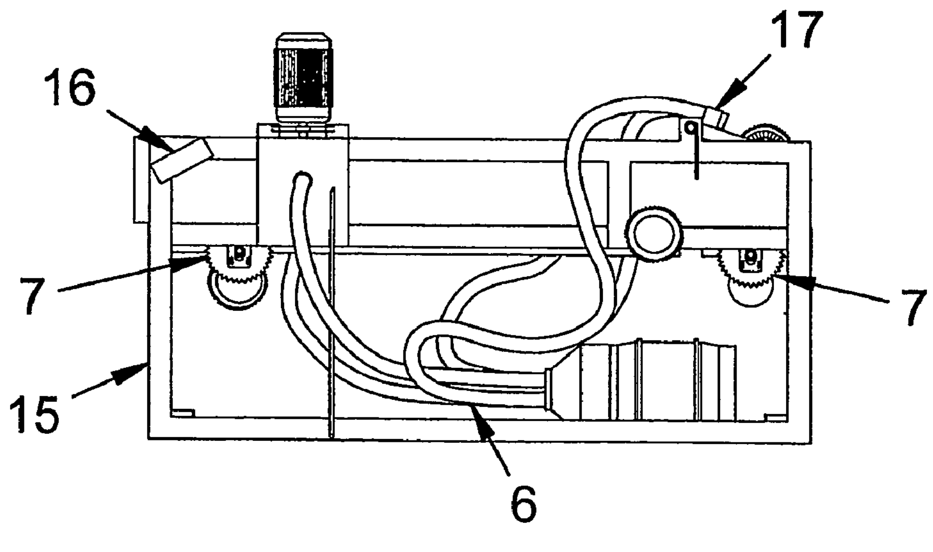
FIG. 4 is a right hand side elevation view of FIG. 1.

The mattress material removal device may preferably have provided at least one guide rail 2 in FIG. 1 which is adapted to be fitted in a fixed or flexible position to enable a user to move the guide rail onto the mattress as required to guide it through the removal device over the base member 15 in FIG. 4. The guide rail may preferably be removably attached to the side panel 4 and 5 in FIG. 1.

In a first embodiment, it is envisaged that the mattress material removal device may preferably have provided a fixed base member 15 in FIG. 4, which is adapted to receive the mattress thereon. The base member 15 may preferably be in the form of a base plate 1 in FIG. 1 having a flat surface and suitable dimensions to hold the mattress thereon. It is envisaged that the base member 15 may have provided at least one roller means 8 in FIG. 1 connected thereto which is adapted to assist the mattress to move over base member. In this embodiment, the components of the device may preferably be adapted to move over and around the mattress for removal of the mattress material. It is envisaged that movement of the components will be automated via the control device 16 in FIG. 5. However, any manual or other suitable means of operation may also be employed.

Figure 2:
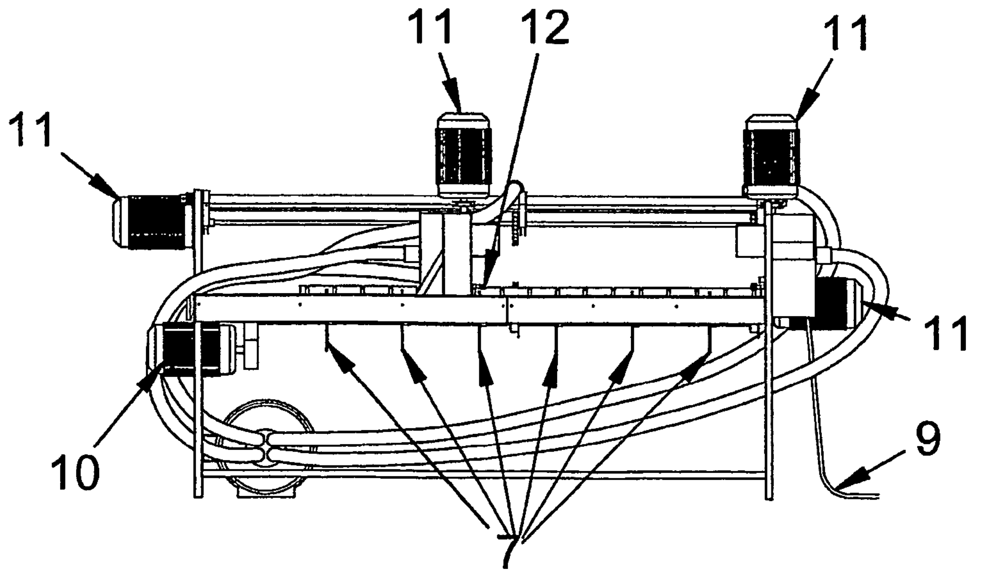
FIG. 2 is a front elevation view of FIG. 1.
Figure 3:
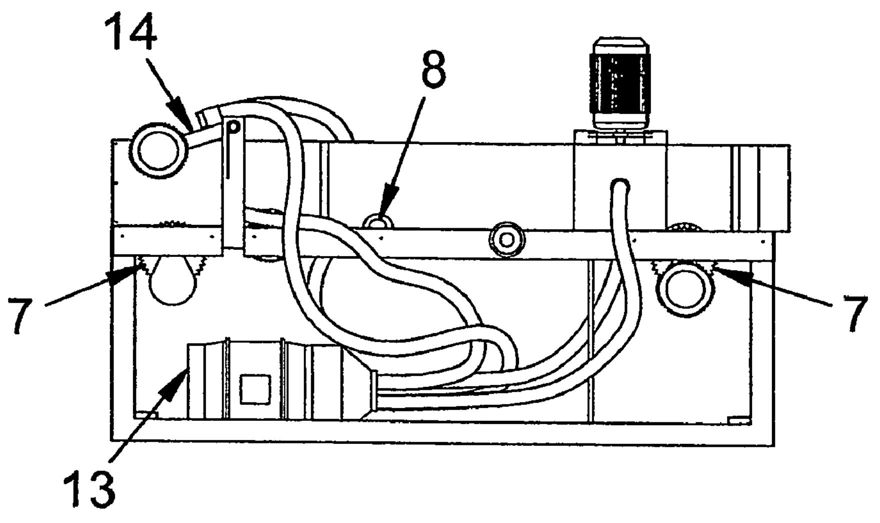
FIG. 3 is a left hand side elevation view of FIG. 1.

In a second embodiment, the base member may have provided a conveyor mechanism 7 and 10 in FIG. 2, which is adapted to move the mattress so that it is in contact with the components of the removal device. It is envisaged that operation of the conveyor mechanism 7 and 10 may be controlled via the control device 16 in FIG. 5. In this embodiment, the components are preferably fixed in position passing through a plurality of openings 3 in FIG. 1 within the base plate 1 and the mattress will be moved along the conveyor of the removal device at an adjustable speed, similar to the concept of a car wash, in order to remove the material from the mattress.

In practice, the mattress is subjected to the brush member 12. As the spinning brush contact the mattress they will work away the material on the mattress, including the material, coir and foam from the top, bottom and sides of the mattress, to leave the underlying spring unit or other internal support exposed so that any remaining material can be removed with ease without requiring a great degree of physical exertion.

While we have described herein a particular embodiment of a mattress material removal device, it is further envisaged that other embodiments of the invention could exhibit any number and combination of any one of the features previously described. However, it is to be understood that any variations and modifications can be made without departing from the spirit and scope thereof.

The invention claimed is:

1. A mattress material removal device for bedding mattresses comprising a fixed base member with at least one side panel, at least one overhead portion and at least one guide rail adapted to secure and guide the mattress over the base member as it moves through the removal device; multiple brush members that make contact with the top, bottom and side of the mattress; at least one suction member positioned in close proximity to at least one brush member; at least one sprinkler device that is positioned in close proximity to the brush member; a conveyor mechanism which is adapted to move the mattress so that it is in contact with the components of the removal device; a control device that has at least one switch which is adapted to activate and de-activate one or more features of the mattress material removal device.

2. The mattress material removal device as claimed in claim 1, wherein the fixed base member has a base plate with a flat surface with suitable dimensions to hold the mattress thereon.

3. The mattress material removal device as claimed in claim 2, wherein the base plate has at least one roller means connected thereto adapted to assist the mattress to move over the said base plate.

4. The mattress material removal device as claimed in claim 2, wherein the fixed base member is provided with a plurality of openings there through and the conveyor mechanism and at least one brush member pass through aligned openings.

5. The mattress material removal device as claimed in claim 4, wherein the conveyor mechanism is fitted in or under the base plate so that the conveyor mechanism is in contact with the mattress.

6. The mattress material removal device as claimed in claim 5, wherein the conveyor mechanism is connected and controlled via the control device at an adjustable speed.

7. The mattress material removal device as claimed in claim 6, wherein the control device has one or more switches that activate and de-activate one or more features of the mattress material removal device.

8. The mattress material removal device as claimed in claim 7, wherein the control device is powered from a power supply.

9. The mattress material removal device as claimed in claim 1, wherein the said brush member is fitted within the said side panel, the said overhead portion and the said base member in a position to contact and move over and around the top, bottom or side of a mattress moving through the removal device.

10. The mattress material removal device as claimed in claim 9, wherein the said brush member has a removably fitted brush head made of a plurality of rough wire bristles that rotates and spins easily.

11. The mattress material removal device as claimed in claim 10, wherein the rough wire bristles are made from material rough enough to tear and cause agitation against the mattress material to aid in its removal.

12. The mattress material removal device as claimed in claim 10, wherein the said brush member is connected and controlled via the control device.

13. The mattress material removal device as claimed in claim 12, wherein the control device spins the brush head at an adjustable speed to suit different mattress material types.

14. The mattress material removal device as claimed in claim 10, wherein the said brush member is motorised.

15. The mattress material removal device as claimed in claim 1, wherein the said guide rail is removably fitted in a fixed or flexible position such that it is in contact and moves over and around the top and side of a mattress moving through the removal device.

16. The mattress material removal device as claimed in claim 1, wherein the said suction member is fitted within the said side panel, the said overhead portion and the said base member in close proximity to the said brush member.

17. The mattress material removal device as claimed in claim 16, wherein the said suction member has a suction portion connected to it in the shape of a tube.

18. The mattress material removal device as claimed in claim 17, wherein the said suction member is connected to the control device and a vacuum source.

19. The mattress material removal device as claimed in claim 18, wherein the vacuum source is powered from a power supply to produce a suction to remove mattress material debris.

20. The mattress material removal device as claimed in claim 1, wherein the said sprinkler device is fitted within the said side panel, the said overhead portion and the said base member in close proximity to the said brush member to spray water over and around the top, bottom or side of a mattress moving through the removal device.

21. The mattress material removal device as claimed in claim 20, wherein the said sprinkler device is preferably a pipe or tube which is adapted to supply water to a sprinkler head.

22. The mattress material removal device as claimed in claim 21, wherein the said sprinkler device is connected to a mains or portable water supply via a tap or plumbing connection or alternatively connection to a portable water source.

23. The mattress material removal device as claimed in claim 22, wherein the said sprinkler device is connected to a control device that manages water supply and pressure.

* * * * *